US008440766B2

(12) United States Patent
Rodrígues de Castro et al.

(10) Patent No.: US 8,440,766 B2
(45) Date of Patent: May 14, 2013

(54) HETEROGENEOUS VINYL ACETATE BASED COPOLYMERS AS BINDER FOR PAINTS

(75) Inventors: Lizandra Belmonte Rodrígues de Castro, Mainz (DE); Kerstin Gohr, Hochheim am Main (DE)

(73) Assignee: Celanese Emulsions GmbH, Frankfurt (DE)

( * ) Notice: Subject to any disclaimer, the term of this patent is extended or adjusted under 35 U.S.C. 154(b) by 356 days.

(21) Appl. No.: 12/845,072

(22) Filed: Jul. 28, 2010

(65) Prior Publication Data

US 2012/0029142 A1 Feb. 2, 2012

(51) Int. Cl.
*C08L 33/06* (2006.01)

(52) U.S. Cl.
USPC .............. 525/228; 525/229; 524/533

(58) Field of Classification Search ............ 525/228, 525/229; 524/533
See application file for complete search history.

(56) References Cited

U.S. PATENT DOCUMENTS

| | | | |
|---|---|---|---|
| 4,325,856 A * | 4/1982 | Ishikawa et al. | 524/458 |
| 4,948,822 A * | 8/1990 | Iovine et al. | 523/201 |
| 5,439,960 A * | 8/1995 | Mudge et al. | 524/111 |
| 6,005,042 A | 12/1999 | Desor et al. | |
| 6,060,566 A * | 5/2000 | Denzinger et al. | 525/455 |
| 7,285,590 B2 | 10/2007 | Holub et al. | |
| 2001/0009929 A1* | 7/2001 | Blankenship et al. | 521/64 |
| 2002/0010267 A1* | 1/2002 | Klaerner et al. | 525/91 |
| 2005/0027079 A1* | 2/2005 | Palmer Lauer et al. | 525/244 |
| 2008/0249242 A1* | 10/2008 | Van Der Slot et al. | 525/70 |
| 2009/0156701 A1* | 6/2009 | Heuts et al. | 521/57 |
| 2009/0203814 A1 | 8/2009 | Petri et al. | |
| 2010/0167611 A1* | 7/2010 | McLennan et al. | 442/43 |

FOREIGN PATENT DOCUMENTS

| | | |
|---|---|---|
| DE | 3827975 A1 | 3/1990 |
| DE | 3901073 A1 | 7/1990 |
| DE | 4435423 A1 | 4/1996 |
| EP | 0040419 A2 | 11/1981 |
| EP | 0417568 A2 | 3/1991 |
| EP | 0567812 A1 | 11/1993 |
| EP | 0778290 A2 | 6/1997 |

* cited by examiner

*Primary Examiner* — Margaret Moore
(74) *Attorney, Agent, or Firm* — Dority & Manning, P.A.

(57) ABSTRACT

The present invention describes a method for the manufacturing of a multi-stage polymer by the following steps:
a) polymerizing monomer mixture (A) comprising
   a-i) vinyl acetate and
   a-ii) at least one vinyl ester of an aromatic carboxylic acid
via free radical emulsion polymerization to obtain copolymer (A); and
b) polymerizing monomer mixture (B) comprising
   b-i) vinyl acetate and
   b-ii) at least one vinyl ester of aliphatic branched or unbranched carboxylic acids having at least 3 carbon atoms,
via free radical emulsion polymerization in the presence of copolymer (A) to obtain the multi-stage polymer
with the proviso that said monomer mixture (B) can also be polymerized first to obtain a copolymer (B) and subsequently monomer mixture (A) is polymerized in the presence copolymer (B) to obtain the multi-stage polymer.

15 Claims, No Drawings

HETEROGENEOUS VINYL ACETATE BASED COPOLYMERS AS BINDER FOR PAINTS

The present invention relates to a method for the manufacturing of a multi stage polymer dispersion based on vinyl ester copolymers as well as their use.

Aqueous polymer dispersions are used as binders for the preparation of both pigmented and unpigmented, aqueous formulations which are used, for example, as coating materials. The pigmented coating materials include in particular glazes, emulsion finishes, emulsion paints, synthetic resin-bound renders, sealing compounds and filling compounds, which are widely used both in the protection of buildings and in the decorative sector. The unpigmented coating materials include, for example, clear finishes. Moreover, plastic dispersions are the main component of water-based food coatings which are intended to protect the substrate from drying out and harmful environmental influences.

Coating compositions must meet a multiplicity of practical requirements, for example sufficient blocking resistance of the dried coatings and sufficient stability of the coatings to abrasive stress, in addition to good processability of the aqueous formulations even at low processing temperatures.

In the case of binder-rich coating compositions (low pigment volume concentration "PVC") whose surfaces are characterized by a high proportion of polymeric binder, gloss properties of dried coatings are also of primary importance apart from the blocking resistance and abrasion resistance.

These requirements with respect to coating compositions is taken into account in the prior art by different approaches.

Some of these approaches include the use of organic solvents and/or plasticizers. The liberation of volatile, organic constituents is, however, undesired owing to their harmful effect on man and the environment, in particular in applications in interior rooms.

Therefore, there is a considerable need for aqueous plastic dispersions which make it possible to formulate plasticizer- and solvent-free coating systems having high binder contents (low PVC) or having low binder contents (high PVC) and which meet the requirements with regard to blocking resistance and gloss properties.

US-A1-2009/0203814 discloses aqueous plastic dispersions based on vinyl ester copolymers having a solids content of up to 80% by weight and minimum film formation temperature below 20° C. The vinyl ester copolymers mandatorily require 0.05 to 10% by weight of at least one unsaturated, copolymerizable organo silicon compound. The block resistance properties as well as the gloss properties in a low PVC formulation, are however, not sufficient.

U.S. Pat. No. 7,285,590 B2 and U.S. Pat. No. 6,005,042 disclose multi stage acrylic ester dispersions which can be used as binders in aqueous paint formulations.

While aqueous multi stage polymer dispersions have been described in the prior art there is a continuing need for aqueous dispersions comprising copolymers which are based on vinyl esters and which provide excellent performance properties such as blocking resistance, wet adhesion and high gloss, all with minimal VOC levels and which further demonstrate at least two distinct glass transition temperature (Tg) steps.

Surprisingly, it has been found that aqueous dispersions of multi stage emulsion polymers on basis of specific vinyl ester copolymers are suitable for the formulation of low VOC (<30 g/l) to solvent free coating material which demonstrate an excellent block resistance as well as a high gloss.

The present invention relates to a method for the manufacturing of a multi-stage polymer by the following steps:

a) polymerizing a monomer mixture (A) comprising
a-i) vinyl acetate and
a-ii) at least one vinyl ester of an aromatic carboxylic acid
via free radical emulsion polymerization to obtain a copolymer (A); and
b) polymerizing a monomer mixture (B) comprising
b-i) vinyl acetate and
b-ii) at least one vinyl ester of aliphatic branched or unbranched carboxylic acids having at least 3 carbon atoms,
via free radical emulsion polymerization in the presence of copolymer (A) to obtain the multi-stage polymer
with the proviso that said monomer mixture (B) can also be polymerized first to obtain a copolymer (B) and subsequently monomer mixture (A) is polymerized in the presence copolymer (B) to obtain the multi-stage polymer.

The method of the present invention is a so-called step polymerization. This is generally understood as meaning a procedure in which, in a first stage, the monomers of the first stage are polymerized by a free radical, aqueous emulsion polymerization, preferably in the presence of seed latex which is preferably prepared in situ, and the monomers of the second stage are then polymerized in the aqueous dispersion of the resulting polymer of the first stage. If appropriate, further polymerization stages may follow. A distinction is made here between the comonomers of the first and second stages with regard to the type of the monomers. In general, when choosing the monomer composition of the individual stages, a procedure is adapted in which in a first stage a monomer composition which leads to the formation of a first stage polymer is chosen and in a further stage, preferably the second stage, a corresponding second monomer mixture is polymerized. However, it is also possible to proceed in the converse manner and produce the first stage copolymer in the presence of the previously prepared second stage copolymer.

The multi stage polymer which is prepared by the method according to the present invention is a vinyl ester copolymer. The vinyl ester copolymer is prepared by means of the step polymerization and comprises, regardless of the detectable morphology, all copolymers in which the polymer components (monomer mixture (A) and monomer mixture (B)) have been produced by successive stages of the emulsion polymerization.

According to the present invention the monomer or the monomer mixture can be added as neat monomer(s) or as pre-emulsified monomer(s).

It has been found that the multi stage polymers which are obtainable by the method of the invention and which have at least two glass transition temperatures (Tg) demonstrate especially improved block resistance with good gloss properties.

Preferred are multi-stage polymers which have two different glass transition temperatures (Tg) having a difference of at least 15 K, preferably at least 20 K and more preferably at least 25 K.

More preferably the multi-stage polymer obtainable by the method according to the invention comprises at least one glass transition temperature (Tg) ranging from 35 to 50° C., preferably ranging from 37 to 48° C. and at least one glass transition temperature ranging from −10 to 20° C., preferably from −5 to 15° C. According to the present invention the glass transition temperature (Tg) is determined according to ASTM E 1356 by Differential Scanning Calorimetry (DSC) on a Mettler DSC 820 apparatus. The tested range is from −10° C. to 130° C. with a heating range of +10° C./min.

Monomer mixture (A) comprises vinyl acetate (a-i)) and at least one vinyl ester of an aromatic carboxylic acid (a-ii)).

An essential monomer of monomer mixture (A) is monomer a-ii), i.e. a vinyl ester of an aromatic carboxylic acid. Within the meaning of the present invention an aromatic carboxylic acid means any carboxylic acid which comprises at least one aromatic moiety. However, according to a preferred embodiment the carboxylic acid is directly linked to the aromatic moiety, more preferably directly linked to a phenyl moiety.

Monomer a-ii) is a vinyl ester of an aromatic carboxylic acid wherein the aromatic carboxylic acid is preferably selected from the group consisting of benzoic acid, substituted benzoic acid, phenyl iso-butanoic acid, phenyl propionic acid, t-butyl benzoic acid and benzoic acid substituted with a $C_1$ to $C_4$ alkyl rest. Especially preferred as monomer a-ii) is vinyl benzoate or derivatives thereof.

According to a preferred embodiment monomer mixture (A) comprises monomer a-ii) in an amount ranging from 1 to 49 wt.-%, preferably ranging from 2 to 25 wt.-% and more preferably ranging from 5 to 15 wt.-% based on the total weight of monomers a-i) and a-ii).

A further essential monomer of monomer mixture (A) is monomer a-i), i.e. vinyl acetate.

Monomer mixture (A) comprises vinyl acetate in an amount of preferably at least 50 wt.-%, more preferably at least 65 wt.-% and most preferably in an amount ranging from 85 to 95 wt.-%, based on the total weight of monomers a-i) and a-ii).

Optimal results for the multi-stage polymer can be achieved wherein monomer mixture (A) comprises vinyl acetate a-i) and monomer a-ii) in a weight ratio a-i) to a-ii)) ranging from 99:1 to 51:49, preferably 95:5 to 80:20 and more preferably 95:5 to 85:15.

According to a preferred embodiment of the invention monomer mixture (A) comprises monomer a-i) and monomer a-ii) in an amount of at least 80 wt.-%, more preferred at least 90 wt.-% and especially preferred of at least 95 wt.-%, based on the total weight of radically polymerizable monomers in the monomer mixture (A).

A further essential step of the method of the present invention is the polymerization of monomer mixture (B). Monomer mixture (B) comprises vinyl acetate (b-i)) and at least one vinyl ester of aliphatic branched or unbranched carboxylic acids having at least 3 carbon atoms (b-ii)). Monomer b-ii) is preferably an aliphatic carboxylic acid having 3 to 18 carbon atoms and wherein the aliphatic moiety can be branched or unbranched.

According to a preferred embodiment of the invention monomer b-ii) is a vinyl ester of an aliphatic carboxylic acid having 3 to 16 carbon atoms, preferably a vinyl ester of an α-branched carboxylic acids having 4 to 12 carbon atoms and more preferably selected from the group consisting of vinyl laurat, vinyl-2-ethyl-hexanoate and vinyl ester of α-branched carboxylic acids having 10 or 11 carbon atoms.

Monomer b-ii) is preferably a vinyl ester of 2-ethyl-hexanoic acid or a vinyl ester of a α-branched carboxylic acid having 10 carbon acid which is commercially available as Veova 10™.

A further essential monomer of monomer mixture (B) is vinyl acetate b-i). Vinyl acetate b-i) is present in monomer mixture (B) in an amount preferably ranging from 5 to 95 wt.-%, more preferably from 30 to 70 wt.-% and most preferably form 40 to 60 wt.-%, based on the total weight of monomers b-i) and b-ii).

Monomer mixture (B) comprises monomer b-ii) in an amount preferably ranging from 5 to 95 wt.-%, more preferably ranging from 30 to 70 wt.-% and most preferably ranging from 40 to 60 wt.-% based on the total weight of monomers b-i) and b-ii).

Optimal results for the multi-stage polymer can be achieved wherein monomer mixture (B) comprises vinyl acetate b-i) and monomer b-ii) in a weight ratio b-i) to b-ii) ranging from 95:5 to 5:95, preferably 3:7 to 7:3 and more preferably 6:4 to 4:6.

According to a preferred embodiment of the invention monomer mixture (B) comprises monomer b-i) and monomer b-ii) in an amount of at least 80 wt.-%, more preferred at least 90 wt.-% and especially preferred of at least 95 wt.-%, based on the total weight of radically polymerizable monomers in monomer mixture (B).

The present invention further relates to a method wherein the weight ratio of monomer mixture (A) to monomer mixture (B) preferably ranges from 3:7 to 7:3, more preferably from 4:6 to 6:4.

The method of the invention is carried out as an emulsion polymerization. Therefore, according to a preferred embodiment of the present invention the first polymerization stage and/or the second polymerization stage is carried out in the presence of a nonionic surfactant, preferably ethoxylated aliphatic alcohols or phenols, more preferably selected from the group consisting of $C_{10}$ to $C_{22}$ alcohols with an average degree of ethoxylation of 3 to 50, mono-, di- and trialkylphenols with an alkyl radical having 4 to 9 carbon atoms and an average ethoxylation degree of 3 to 50.

Suitable nonionic surfactants are araliphatic and aliphatic nonionic emulsifiers, for example ethoxylated mono-, di- and trialkylphenols (degree of ethoxylation: from 3 to 50, alkyl radical: $C_4$ to $C_9$), ethoxylates of long-chain, branched or straight-chain alcohols (degree of ethoxylation: from 3 to 50, alkyl radical: $C_6$ to $C_{36}$) and polyethylene oxide/polypropylene oxide block copolymers.

Ethoxylates of long-chain, branched or straight-chain alkanols (alkyl radical: $C_6$ to $C_{22}$, average degree of ethoxylation: from 3 to 50) are preferably used, and among these particularly preferably those based on natural alcohols, Guerbet alcohols or oxo alcohols having a linear or branched $C_{12}$-$C_{18}$-alkyl radical and a degree of ethoxylation of from 8 to 50.

Further, according to a preferred embodiment the first polymerization stage and/or the second polymerization stage is conducted in the presence of an anionic surfactant, preferably in the presence of an alkyl benzene sulfonate.

Anionic surfactants include alkali metal and ammonium salts of alkylsulfates (alkyl radical: $C_6$ to $C_{18}$), alkylphosphonates (alkyl radical: $C_6$ to $C_{18}$), of sulfuric acid monoesters or phosphoric acid mono- and diesters of ethoxylated alkanols (degree of ethoxylation: from 2 to 50, alkyl radical: $C_6$ to $C_{22}$) and of ethoxylated alkylphenols (degree of ethoxylation: from 3 to 50, alkyl radical: $C_4$ to $C_9$), of alkanesulfonic acids (alkyl radical: $C_{12}$ to $C_{18}$), of alkylarylsulfonic acids (alkyl radical: $C_9$ to $C_{18}$), of sulfosuccinic acid monoesters and sulfosuccinic acid diesters of alkanols (alkyl radical: $C_6$ to $C_{22}$) and ethoxylated alkanols (degree of ethoxylation: from 2 to 50, alkyl radical: $C_6$ to $C_{22}$), and of nonethoxylated and ethoxylated alkylphenols (degree of ethoxylation: from 3 to 50, alkyl radical: $C_4$ to $C_9$).

As a rule, the above-mentioned surfactants are used as industrial mixtures, the data on the length of alkyl radical and EO chain relating to the respective maximum of the distributions occurring in the mixtures. Examples from said surfactant classes are Texapon® K12 (sodium laurylsulfate from Cognis), Emulsogen® EP ($C_{13}$-$C_{17}$-alkylsulfonate from Clariant), Marani® I A 25 IS (sodium n-alkyl-($C_{10}$-$C_{13}$)benzenesulfonate from Cognis), Genapol® liquid ZRO (sodium $C_{12}/C_{14}$-alkyl ether sulfate having 3 EO units from Clariant), Hostapal® BVQ-4 (sodium salt of a nonylphenol ether sulfate having 4 EO units from Clariant), Aerosol® MA 80 (sodium dihexylsulfosuccinate from Cyctec Industries), Aerosol® A-268 (disodium isodecylsulfosuccinate from Cytec Industries), Aerosol® A-103 (disodium salt of a monoester of sulfosuccinic acid with an ethoxylated nonylphenol from Cytec Industries).

Optionally colloids such as polyvinyl alcohol, cellulose and cellulose derivatives, starch and starch derivatives are also present to improve stabilization.

A detailed description of further, suitable protective colloids is to be found in Houben-Weyl, Methoden der organischen Chemie [Methods of Organic Chemistry], Volume XIV/ I, Makromolekulare Stoffe [Macromolecular Substances], Georg Thieme Verlag, Stuttgart 1961, pages 411 to 420.

Preferably monomer mixture (A) and/or monomer mixture (B) are essentially free of unsaturated copolymerizable organo silicon compounds.

Essentially free within the meaning of the present invention means that the respective component is present in an amount of less than 0.5 wt.-%, preferably less than 0.2 wt.-% and more preferably free, wherein the wt.-% is based on the total weight of the radically polymerizable monomers in monomer mixture (A) and (B) respectively.

It has been found that the wet adhesion can be further improved by specific adhesion improving monomers which can be copolymerized with monomer mixture (A) and/or (B). Therefore, according to a preferred embodiment monomer mixture (A) and/or (B) additionally comprise at least one adhesion improving monomer. The adhesion improving monomer is preferably present in monomer mixture (A) and/ or monomer mixture (B) in an amount of from 0.1 to 10 percent by weight, preferably from 0.5 to 5 percent by weight, based on the total weight of the radically polymerizable monomers used in the respective monomer mixture.

Monomer mixture (A) and/or monomer mixture (B) preferably comprises at least one adhesion improving monomer, preferably selected from the group consisting of acetoacetoxy ethyl(meth)acrylate, allyl acetoacetate, N-vinylurea, N-allylurea, N-vinylimidazolidin-2-one- and N-allylimidazolidin-2-one, N-vinyloxyethylimidazolidin-2-one, N-(2-(meth) acrylamidoethyl)imidazolidin-2-one, N-(2-(meth) acryloxyethyl)imidazolidin-2-one, N-(2-(meth) acryloxyacetamidoethyl)imidazolidin-2-one and N-2-(allylcarbamate)aminoethylimidazolidone.

Additionally, monomer mixture (A) and/or (B) may also contain crosslinking additives. Such additives may be: aromatic ketones, such as, for example, alkyl phenyl ketones, which optionally have one or more substituents on the phenyl ring, or benzophenone and substituted benzophenones as photoinitiators. Photoinitiators suitable for this purpose are disclosed, for example, in DE-A-38 27 975 and EP-A-0 417 568. Suitable compounds having a crosslinking effect are also water-soluble compounds having at least two amino groups, for example dihydrazides of aliphatic dicarboxylic acids, as disclosed, for example, in DE-A-39 01 073, if the vinyl ester copolymer P contains, incorporated in the form of copolymerized units, monomers containing carbonyl groups.

The multi stage polymer according to the invention which are based on vinyl ester copolymers are preferably produced by free radical, aqueous emulsion polymerization of said monomers in the presence of at least one free radical polymerization initiator and at least one surfactant.

Suitable free radical polymerization initiators are all known initiators which are capable of initiating a free radical, aqueous emulsion polymerization. They may be both peroxides, such as, for example, alkali metal peroxodisulfates, and azo compounds. Other polymerization initiators which may be used are so-called redox initiators, which are composed of at least one organic and/or inorganic reducing agent and at least one peroxide and/or hydroperoxide, such as, for example, tert-butyl hydroperoxide with sulfur compounds, such as, for example, sodium salt of hydroxymethanesulfinic acid, sodium sulfite, sodium disulfite, sodium thiosulfate and acetone bisulfite adduct, or hydrogen peroxide with ascorbic acid. Combined systems which contain a small amount of metal compound which is soluble in the polymerization medium and whose metallic component may occur in a plurality of valency states, such as, for example, ascorbic acid/ iron sulfate/hydrogen peroxide, may also be used, the sodium salt of hydroxymethanesulfinic acid, acetone bisulfite adduct, sodium sulfite, sodium hydrogen sulfite or sodium bisulfite frequently also being used instead of ascorbic acid and organic peroxides, such as, for example, tert-butyl hydroperoxide, or alkali metal peroxodisulfates and/or ammonium peroxodisulfate, being used instead of hydrogen peroxide. Instead of said acetone bisulfite adduct, it is also possible to use further bisulfite adducts known to the person skilled in the art, as described, for example, in EP-A-0 778 290 and in the literature cited therein. Further preferred initiators are peroxodisulfates, such as, for example, sodium peroxodisulfate. The amount of the free radical initiator systems used is preferably from 0.05 to 2.0% by weight, based on the total amount of the monomers to be polymerized.

The molecular weight of the vinyl ester copolymers can be adjusted by addition of small amounts of one or more substances which regulate the molecular weight. These so-called "chain transfer agent" are used in general in an amount of up to 2% by weight, based on the monomers to be polymerized. "Chain transfer agent" which may be used are all those substances which are known to the person skilled in the art.

For example, organic thio compounds, silanes, allyl alcohols and aldehydes are preferred.

The emulsion polymerization is usually effected by the batch procedure, preferably by a semicontinuous method. In semicontinuous methods, the main amount, i.e. at least 70%, preferably at least 90%, of the monomers to be polymerized are fed continuously (including step gradient procedure) to the polymerization batch. This procedure is also referred to as a monomer feed method, monomer feed being understood as meaning the metering in of gaseous monomers, liquid monomer mixtures, monomer solutions or in particular aqueous monomer emulsions. The metering of the individual monomers can be effected through separate feeds.

In addition to the seed-free method of production, the emulsion polymerization can also be effected by the seed latex method or in the presence of seed lattices produced in situ, for establishing a defined polymer particle size. Such methods are known and are described in detail in a large number of patent applications (e.g. EP-A-0 040 419 and EP-A-0 567 812) and publications ("Encyclopedia of Polymer Science and Technology", Vol. 5, John Wiley & Sons Inc., New York 1966, page 847).

After the actual polymerization reaction, it may be desirable and/or necessary to substantially free the aqueous plastic dispersions according to the invention from odoriferous substances, such as, for example, residual monomers and other volatile, organic constituents. This can be achieved in a manner known per se, for example physically by distillative removal (in particular via steam distillation) or by stripping with an inert gas. Furthermore, the reduction of the residual monomers can also be effected chemically by free radical post polymerization, in particular by the action of the redox initiator systems, as described, for example, in DE-A-44 35 423. A post polymerization with a redox initiator system comprising at least one organic peroxide and an organic and/or inorganic sulfite is preferred. A combination of physical and chemical methods is particularly preferred, the further reduction of the residual monomer content being effected by means of physical methods to preferably <1000 ppm, particularly preferably <500 ppm, in particular <100, after reduction of the residual monomer content by chemical post polymerization.

The multi-stage polymer can be isolated from the aqueous dispersion of the invention which is obtained by the method of the invention.

The multi-stage polymers which are obtainable by the method according to the present invention demonstrate excellent properties and is present in the aqueous dispersions of the invention.

Therefore, a further embodiment of the present invention is an aqueous dispersion comprising a multi-stage polymer which is obtainable by a method according to the invention.

Preferably, the aqueous dispersion comprises solids in an amount of more than 40 weight percent, preferably more than 45 weight percent and especially preferred 48 to 75 weight percent, based on the total weight of the dispersion. In the present invention the term solids content is understood as the total mass of copolymer, based on the total mass of dispersion.

The present invention furthermore relates to an aqueous preparation containing the aqueous dispersion according to the invention which is based on the multi stage polymer of the invention.

Pigments and fillers known to the person skilled in the art can be present in the aqueous preparation of the invention.

Furthermore, the aqueous formulation may also comprise thickeners, for example cellulose derivatives, such as methylcellulose, hydroxyethylcellulose and carboxymethylcellulose, and furthermore casein, gum Arabic, tragacanth gum, starch, sodium alginate, polyvinyl alcohol, polyvinylpyrrolidone, sodium polyacrylates, water-soluble copolymers based on acrylic and (meth)acrylic acid, such as acrylic acid/acrylamide and (meth)acrylic acid/acrylic ester copolymers and so-called associative thickeners, such as styrene/maleic anhydride polymers or preferably hydrophobically modified polyetherurethanes (HEUR) known to the person skilled in the art, hydrophobically modified acrylic acid copolymers (HASE) polyetherpolyols.

Inorganic thickeners, such as, for example, bentonites or hectorite, may also be used.

In addition, waxes based on paraffins and polyethylene, and dulling agents, antifoams, preservatives and water repellents, biocides, fibers and further additives known to the person skilled in the art may also be used as auxiliaries in the aqueous preparation according to the invention.

The aqueous preparations according to the invention are stable fluid systems which can be used for coating a multiplicity of substrates. Consequently, the present invention also relates to methods for coating substrates and to the coating materials themselves. Suitable substrates are, for example, wood, concrete, metal, glass, ceramics, plastic, renders, wallpapers, paper and coated, primed or weathered substrates. The application of the preparation to the substrate to be coated is effected in a manner dependent on the form of the preparation. Depending on the viscosity and the pigment content of the preparation and on the substrate, the application can be effected by means of roll-coating, brushing, knife-coating or as a spray.

It is especially preferred to use the entire reaction mixture of the method of the present invention as the aqueous dispersion of the present invention.

A further embodiment of the present invention is the use of the aqueous dispersion of the invention as a binder in organic or inorganic pigment containing aqueous preparations such as paints or coatings.

A further embodiment of the present invention is the use of the aqueous dispersion of the invention as a binder in synthetic resin-bound renders, tile adhesives, paints, sealing compounds and sealing compositions or papercoating slips.

The invention is described in more detail below with reference to working examples, but without limiting in any way thereby.

EXAMPLES

All percentages indicated are by weight unless noted otherwise

Example 1a

Heterogeneous Process to Obtain a Vinyl Copolymer Dispersion:

A 3 L reactor equipped with a stirrer, jacket heating, reflux condenser, nitrogen purge and feed tubes is filled with:
  996 g deionized water,
    58 g of a 65% aqueous solution of a commercial non-ionic surfactant Disponil® A 3065 (highly ethoxylated fatty alcohol),
    39 g of a 20% aqueous solution of a commercial anionic surfactant (alkylbenzene sulfonate),
    20 g of a 30% aqueous solution of sodium vinyl sulfonate and
  3 g of sodium acetate.

The aqueous phase is heated up to 65° C. while slowly adding a monomer mixture comprising 54 g of vinyl acetate and 6 g of vinyl benzoate. When the temperature reaches 65° C. the initiator is added (19 g of a 7% aqueous solution of sodium persulfate) and the temperature is raised to 70° C. At 70° C. the reactor is fed with a first monomer mixture comprising of 485 g of vinyl acetate and 54 g of vinyl benzoate over 120 minutes and with 55 g of a 3% sodium persulfate aqueous solution over 240 minutes. The reaction temperature is kept at 75° C. Subsequently, to the reaction mixture of the first stage polymerization a second monomer mixture comprising 300 g of vinyl acetate and 300 g of vinyl 2-ethylhexanoate is added over 120 minutes. Subsequently, 12 g of a 9% sodium persulfate aqueous solution is added, the temperature is raised to 85° C. and held for 60 minutes. The reaction is cooled to 50° C. and a 5% solution of an oxidizing agent is added over 10 min followed by a 5% solution of a formaldehyde-free sulfinic acid reducing agent added over 10 min to finish the polymerization. The reaction is then cooled down and filtered.

Example 1b

Heterogeneous Process to Obtain a Vinyl Copolymer Dispersion

The reaction is carried out in the same manner as Example 1a), however, with the difference that the second monomer mixture comprises 300 g vinyl acetate and 300 g of Veova 10™ (vinyl ester of versatic acid 10)

Example 2a

Heterogeneous Process to Obtain Vinyl Copolymer Dispersion with Pre-Emulsified Monomers A 3 L reactor equipped with a stirrer, jacket heating, reflux condenser, nitrogen purge and feed tubes is filled with:
- 593 g deionized water,
- 6 g of a 65% aqueous solution of a commercial non-ionic surfactant Disponil® A 3065 (highly ethoxylated fatty alcohol),
- 8 g of a 20% aqueous solution of a commercial anionic surfactant (alkylbenzene sulfonate),
- 20 g of a 30% aqueous solution of sodium vinyl sulfonate and
- 3 g of sodium acetate.

The aqueous phase is heated up to 65° C. while slowly adding a first monomer mixture comprising 53 g of vinyl acetate and 6 g of vinyl benzoate. When the temperature reaches 65° C. the initiator is added (30 g of an 8% aqueous solution of sodium metabisulfite) and the temperature is raised to 70° C. At 70° C. the reactor is fed with the monomer pre-emulsion I over 120 minutes and with 55 g of a 6% sodium persulfate aqueous solution over 240 minutes. The reaction temperature is kept at 70° C. Subsequently, the monomer pre-emulsion II is added over 120 minutes. When the pre-emulsion II addition is finished, 12 g of an aqueous redox solution (3% sodium metabisulfit and 2% sodium persulfate) is added, the temperature is raised to 85° C. and held for 60 minutes. The reaction is cooled to 50° C. and a 5% solution of an oxidizing agent is added over 10 min followed by a 5% solution of a formaldehyde-free sulfinic acid reducing agent added over 10 min to finish the polymerization. The reaction is then cooled down and filtered.

Monomer Pre-Emulsion I:
The monomer pre-emulsion I was prepared by mixing:
- 210 g deionized water,
- 9 g of a 65% aqueous solution of a commercial non-ionic surfactant Disponil® A 3065 (highly ethoxylated fatty alcohol),
- 20 g of a 20% aqueous solution of a commercial anionic surfactant (alkylbenzene sulfonate),
- 476 g vinyl acetate and
- 53 g vinyl benzoate.

Monomer Pre-Emulsion II:
The monomer pre-emulsion II was prepared by mixing:
- 210 g deionized water,
- 9 g of a 65% aqueous solution of a commercial non-ionic surfactant Disponil® A 3065 (highly ethoxylated fatty alcohol),
- 20 g of a 20% aqueous solution of a commercial anionic surfactant (alkylbenzene sulfonate),
- 294 g vinyl acetate and
- 294 g vinyl 2-ethylhexanoate

Example 2b

Heterogeneous Process to Obtain a Vinyl Copolymer Dispersion with Functional Monomers The reactor was filled with the same water phase as in Example 1a), however parallel to the addition of monomer mixtures I and II 60 g of a 20% aqueous solution of diacetone acrylamide was separately added. At the end of the polymerization and after cooling down, 132 g of a 10% solution of adipic acid dihydrazide was added.

Example 2c

Heterogeneous Process to Obtain a Vinyl Copolymer Dispersion with Functional Monomers The reaction is carried out in the same manner as in Example 2a), however 1.5 g of diallylphtalate is added to the pre-emulsion I, and 25 g of WAM IV™ (50% aqueous solution of N-2-(Allylcarbamato)-aminoethylimidazolidinone).

Comparative Example 3

Heterogeneous Process to Obtain a Vinyl Copolymer Dispersion

The reaction was carried out in the same manner as in Example 1a), however the first monomer mixture comprises only 539 g of vinyl acetate and the second monomer mixture contains 240 g of vinyl acetate and 360 g of Veova 10™.

Comparative Example 4

Homogeneous Process to Obtain a Vinyl Copolymer Dispersion

The reaction is carried out in the same manner as for Example 1a). However, the process is now homogeneous and the monomers were slowly added as only one monomer mixture in the following manner:

The aqueous phase is heated up to 65° C. while slowly adding a monomer mixture comprising 42 g of vinyl acetate, 3 g of vinyl benzoate and 15 g of vinyl 2-ethylhexanoate. When the temperature reaches 65° C. the initiator is added (19 g of a 6.2% aqueous solution of sodium persulfate) and the temperature is raised to 70° C. At 70° C. the reactor is fed with the monomer mixture comprising 797 g of vinyl acetate, 57 g of vinyl benzoate and 285 g of vinyl 2-ethylhexanoate over 240 min and with 55 g of a 3.3% sodium persulfate aqueous solution also over 240 minutes. The reaction temperature is kept at 75° C. Subsequently, 12 g of a 9% sodium persulfate aqueous solution is added, the temperature is raised to 85° C. and held for 60 minutes. The reaction is cooled to 50° C. and a 5% solution of an oxidizing agent is added over 10 min followed by a 5% solution of a formaldehyde-free sulfinic acid reducing agent added over 10 min to finish the polymerization. The reaction is then cooled down and filtered.

Analysis of the Multi-Stage Polymers:

TABLE 1

| Polymer | Solid content (%) | Brookfield Viscosity (mPas) | Tg (° C.) first Tg/ second Tg |
|---|---|---|---|
| Example 1a) | 52 | 1300 | 7/43 |
| Example 1b) | 52 | 1300 | 15/38 |
| Example 2a) | 50 | 100 | 8/45 |
| Example 2b) | 51 | 1000 | 8/46 |
| Example 2c) | 50 | 200 | 10/47 |
| Example 3) Comparative | 52 | 300 | 36* |
| Example 4) Comparative | 52 | 2000 | 22* |
| (Comparative Example) Example 5 of US 2009/0203814 | 50 | 1000 | 20* |

TABLE 1-continued

| Polymer | Solid content (%) | Brookfield Viscosity (mPas) | Tg (° C.) first Tg/ second Tg |
|---|---|---|---|
| Rhoplex ™ HG-706** (Comparative Example) | 45 | <500 | 9/45 |

*only one Tg determined
**see Table 3
Solid content: Solid content in wt.-% based on the aqueous dispersion
Brookfield viscosity: Determined at 25° C. - spindle 2, 20 rpm
Glass transition temperature (Tg):

Determination of the Glass Transition Temperature according to ASTM E 1356 by Differential Scanning Calorimetry (DSC) with a Mettler DSC 820 with a fluid $N_2$ cooling system. The tested range is from −80° C. to 130° C. with a heating rate of +10° C./min.

Application of the Dispersions—Binder for Low PVC Paints with Block Resistance and Wet Adhesion (Aqueous Preparation)

The block resistance was tested according to the ASTM D-4946 and wet adhesion according to ASTM D-3359-02 method in the following formulation for a gloss paint with 21% PVC:

TABLE 2

|  | Active Solid [%] | Amount [g] |
|---|---|---|
| Water | 0 | 195 |
| propylene glycol | 0 | 5.0 |
| Natrosol ® 330[1] | 100 | 2.0 |
| Carbowet ® 106[2] | 100 | 2.0 |
| Tamol ® 1124[3] | 50 | 3.0 |
| Foamstar ® A38[4] | 100 | 5.0 |
| Acticide ® BW20[5] | 100 | 1.1 |
| AMP ® 95[6] | 95 | 4.5 |
| Kronos ® 2310[7] | 100 | 250 |
| Polyphobe ® TR 116[8] | 40 | 1.1 |
| Polyphobe ® TR 117[9] | 40 | 2.1 |
| Texanol ®[10] | 0 | 5.0 |
| Aqueous dispersion according to Examples in Table 1 | 50 | 530 |

[1]Natrosol ® 330: associative cellulosic thickener
[2]Carbowet ® 106: pigment wetting agent
[3]Tamol ™ 1124: pigment dispersant agent
[4]Foamstar ® A 38: defoamer
[5]Acticide ® BW 20: biocide
[6]AMP-95 ™: Co-dispersant and neutralizing agent
[7]Kronos ® 2310: pigment (titanium dioxide)
[8]Polyphobe ™ TR116: rheology modifier (for low shear viscosity)
[9]Polyphobe ™ TR117: rheology modifier (for high shear viscosity)
[10]Texanol ™: coalescing agent (ester alcohol)

Results of Block Resistance and Wet Adhesion of the Paint Formulation in Table 2:

TABLE 3

| Polymer | Paint dried for 1 day Block Resistance at 25° C. | Paint dried for 7 days resistance Block Resistance at 25° C. | Block Resistance at 50° C. | Wet adhesion |
|---|---|---|---|---|
| Example 1a) | 6 | 7 | 2 | 0 |
| Example 1b) | 1 | 7 | 2 | 0 |
| Example 2a) | 6 | 9 | 2 | 0 |
| Example 2b) | 6 | 8 | 5 | 4 |
| Example 2c) | 4 | 6 | 4 | 3 |
| Example 3) Comparative | 1 | 3 | 0 | 0 |
| Example 4) Comparative | 1 | 1 | 0 | 0 |
| Comparative Example Example 5 of US 2009/0203814 | 0 | 0 | 0 | 0 |
| Rhoplex ™ HG-706** Comparative | 6 | 8 | 5 | 5 |

**Rhoplex ™ HG-706 is a 100% acrylic emulsion designed for high gloss and low VOC paint formulation according to the technical data sheet available from Rohm and Haas.

Block Resistance Test According to ASTM D-4946:

The block resistance values mentioned in Table 3 are classified as follows:

| Block Rating | Type of Separation | Performance |
|---|---|---|
| 0 | Separation of films not possible | Very poor |
| 1 | Up to 25% film not damaged | Very poor |
| 2 | 50 to 75% seal | Very poor |
| 3 | 25 to 50% seal | Poor |
| 4 | 5 to 25% seal | Poor to fair |
| 5 | 0 to 5% seal (areal damage) | Fair |
| 6 | Moderate tack; higher number of point damage through the coating film to the substrate | Fair to good |
| 7 | Slight tack; few damages on the coating | Good |
| 8 | Slight tack; higher pressure required | Very good |
| 9 | Very slight tack; slight pressure required | Excellent |
| 10 | No tack, falls apart spontaneously or if shaken | Perfect |

Wet Adhesion Test According to ASTM 3359-02 (Tape Method)

The wet adhesion values mentioned in Table 3 are classified as follows:

TABLE 5

| Classification | Percent area removed |
|---|---|
| 5 | 0 |
| 4 | less than 5% |
| 3 | 5-15% |
| 2 | 15-35% |
| 1 | 35-65% |
| 0 | greater than 65% |

The invention claimed is:

1. Method for the manufacturing of a multi-stage polymer by the following steps:
   a) polymerizing monomer mixture (A) comprising
      a-i) vinyl acetate and
      a-ii) at least one vinyl ester of an aromatic carboxylic acid
      via free radical emulsion polymerization to obtain copolymer (A); and b) polymerizing monomer mixture (B) comprising
   b-i) vinyl acetate and
   b-ii) at least one vinyl ester of aliphatic branched or unbranched carboxylic acids having at least 3 carbon atoms,
via free radical emulsion polymerization in the presence of copolymer (A) to obtain the multi-stage polymer
with the proviso that a weight ratio of monomer mixture (A) to monomer mixture (B) ranges from 3:7 to 7:3 and
with the proviso that said monomer mixture (B) can also be polymerized first to obtain a copolymer (B) and subsequently monomer mixture (A) is polymerized in the presence copolymer (B) to obtain the multi-stage polymer.

2. Method according to claim 1, wherein the multi-stage polymer comprises two different glass transition temperatures (Tg) having a difference of at least 15 K.

3. Method according to claim 1, wherein the multi-stage polymer comprises at least one glass transition temperature (Tg) ranging from 35 to 50° C. and at least one glass transition temperature ranging from −10 to 20° C.

4. Method according to claim 1, wherein monomer mixture (A) comprises monomer a-ii) in an amount ranging from 1 to 49 wt. % based on the total weight of monomers a-i) and a-ii) and/or wherein monomer mixture (A) comprises vinyl acetate in an amount of at least 50 wt. % based on the total weight of monomers a-i) and a-ii).

5. Method according to claim 1, wherein monomer mixture (B) comprises vinyl acetate b-i) in an amount ranging from 5 to 95 wt. % based on the total weight of monomers b-i) and b-ii) and/or wherein monomer mixture (A) comprises vinyl acetate a-i) and monomer a-ii) in a weight ratio (a-i) to a-ii)) ranging from 99:1 to 51:49.

6. Method according to claim 1, wherein monomer mixture (B) comprises monomer b-ii) in an amount ranging from 5 to 95 wt. % based on the total weight of monomers b-i) and b-ii) and/or wherein monomer mixture (B) comprises vinyl acetate b-i) and monomer b-ii) in a weight ratio (b-i) to b-ii)) ranging from 95:5 to 5:95.

7. Method according to claim 1, wherein the monomer a-ii) is a vinyl ester of an aromatic carboxylic acid selected from the group consisting of benzoic acid, substituted benzoic acid, phenyl iso-butanoic acid, phenyl propionic acid, t-butyl benzoic acid and benzoic acid substituted with a $C_1$ to $C_4$ alkyl rest.

8. Method according to claim 1, wherein the monomer b-ii) is a vinyl ester of an aliphatic carboxylic acid having 3 to 16 carbon atoms.

9. Method according to claim 1, wherein the first polymerization stage and/or the second polymerization stage is carried out in the presence of a nonionic surfactant.

10. Method according to claim 1, wherein the first polymerization stage and/or the second polymerization stage is conducted in the presence of an anionic surfactant.

11. Method according to claim 1, wherein monomer mixture (A) and/or (B) additionally comprises at least one adhesion improving monomer which is present in monomer mixture (A) and/or monomer mixture (B) in an amount of from 0.1 to 10 percent by weight based on the total weight of the monomers used in the respective monomer mixture and/or wherein monomer mixture (A) and/or monomer mixture (B) comprises at least one adhesion improving monomer.

12. An aqueous dispersion comprising a multi-stage polymer obtainable by a method according to claim 1.

13. An aqueous dispersion according to claim 12 comprising a solid content of more than 40 weight percent based on the total weight of the dispersion.

14. Method for the manufacturing of a multi-stage polymer by the following steps:
   a) polymerizing monomer mixture (A) comprising
      a-i) vinyl acetate and
      a-ii) at least one vinyl ester of an aromatic carboxylic acid
   via free radical emulsion polymerization to obtain copolymer (A); and
   b) polymerizing monomer mixture (B) comprising
      b-i) vinyl acetate and
      b-ii) at least one vinyl ester of aliphatic branched or unbranched carboxylic acids having at least 3 carbon atoms,
   via free radical emulsion polymerization in the presence of copolymer (A) to obtain the multi-stage polymer
   with the proviso that the multi-stage polymer comprises two different glass transition temperatures (Tg) having a difference of at least 15 K and
   with the proviso that said monomer mixture (B) can also be polymerized first to obtain a copolymer (B) and subsequently monomer mixture (A) is polymerized in the presence copolymer (B) to obtain the multi-stage polymer.

15. Method for the manufacturing of a multi-stage polymer by the following steps:
   a) polymerizing monomer mixture (A) comprising
      a-i) vinyl acetate and
      a-ii) at least one vinyl ester of an aromatic carboxylic acid
   via free radical emulsion polymerization to obtain copolymer (A); and
   b) polymerizing monomer mixture (B) comprising
      b-i) vinyl acetate and
      b-ii) at least one vinyl ester of aliphatic branched or unbranched carboxylic acids having at least 3 carbon atoms,
   via free radical emulsion polymerization in the presence of copolymer (A) to obtain the multi-stage polymer
   with the proviso that the multi-stage polymer comprises at least one glass transition temperature (Tg) ranging from 35 to 50° C. and at least one glass transition temperature ranging from −10 to 20° C. and
   with the proviso that said monomer mixture (B) can also be polymerized first to obtain a copolymer (B) and subsequently monomer mixture (A) is polymerized in the presence copolymer (B) to obtain the multi-stage polymer.

* * * * *